May 23, 1967 — R. D. SANDERS — 3,321,209
DENTAL HANDPIECE CHUCK
Filed Aug. 20, 1964

Inventor:
Ronald D. Sanders,
by John E. Toupal
Attorney

United States Patent Office 3,321,209
Patented May 23, 1967

3,321,209
DENTAL HANDPIECE CHUCK
Ronald D. Sanders, 232 Saddle Road,
Trinidad, Colo. 81082
Filed Aug. 20, 1964, Ser. No. 390,943
18 Claims. (Cl. 279—23)

This invention relates to tool chucks and more particularly to a metal chuck for use in dental handpieces.

Conventional dental handpieces have used various types of bur holding chucks which have proven generally satisfactory. However, some disadvantages have been present in the prior devices. Examples of problems existing in previously available dental handpieces include the requirement for chuck tightening wrenches, slippage between bur and chuck, lack of bur stability, short chuck operating life, excessive vibration, etc.

The object of this invention therefore is to provide an improved dental handpiece which exhibits greater bur stability, longer chuck operating life, greater bur gripping force and requires no chuck tightening tools.

One feature of this invention is the provision of a dental handpiece having a hollow cylindrical metal chuck whose central portion is radially collapsed along a plurality of axial slots which exist and terminate in the central portion of the metal cylinder.

Another feature of this invention is the provision of a dental handpiece of the above featured type wherein the chuck central portion possessing the axial slots has in an uncollapsed condition a smaller outer diameter than the end portions thereof thereby rendering greater resiliency to the central portion.

Another feature of this invention is the provision of a dental handpiece of the above featured types wherein the handpiece chuck central portion possesses three axial slots which are equally spaced about the circumference of the cylindrical chuck body.

Another feature of this invention is the provision of a dental handpiece of the above featured types wherein the inside diameter of one chuck end portion is slightly greater than the inside diameter of the other chuck end portion so as to facilitate insertion of a bur while giving positive support thereto.

Another feature of this invention is the provision of a dental handpiece of the above featured type wherein the smaller inside diameter chuck end portion conforms exactly to the outside diameter of the dental handpiece grinding tool inserted in the hollow cylindrical chuck.

Another feature of this invention is the provision of a dental handpiece of the above featured types wherein the chuck is maintained by a hollow dental handpiece drive shaft and wherein a resilient binding material is positioned between the external surface of the cylindrical chuck central portion and the internal surface of the hollow drive shaft.

Another feature of this invention is the provision of a dental handpiece of the above featured type wherein the resilient binding material comprises a self-hardening silicone rubber adhesive material.

These and other features and objects of this invention will become more apparent on an examination of the following specification taken in conjunction with the accompanying drawings wherein.

Figure 1:
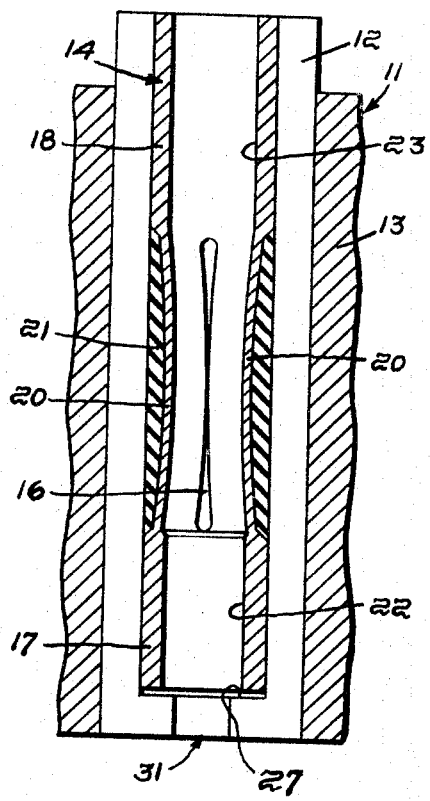
FIG. 1 is a cutaway, cross-sectional view of a preferred dental handpiece chuck embodiment according to the present invention.
Figure 2:
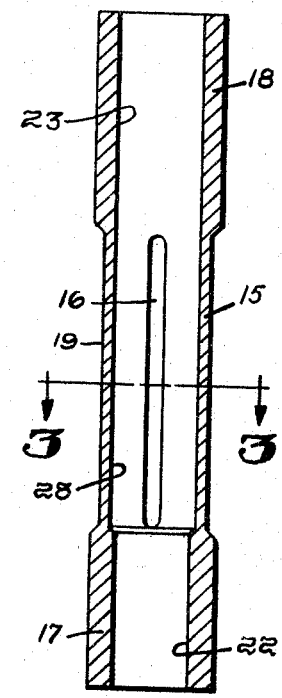
FIG. 2 is an axial cross-sectional view of an uncollapsed version of the cylindrical chuck shown in FIG. 1.
Figure 4:
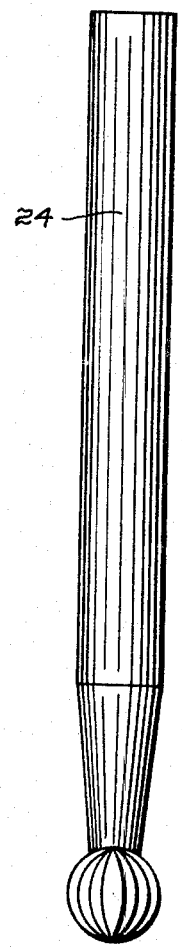
FIG. 4 is a showing of a dental handpiece grinding tool adapted for use in the hollow cylindrical chuck shown in FIG. 1.
Figure 3:
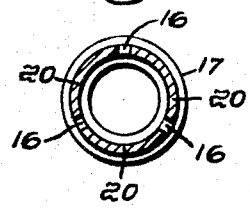
FIG. 3 is a transverse cross-section taken through the central portion of the hollow cylindrical chuck shown in FIG. 2.

Referring now to FIG. 1, there is a partial showing of a dental handpiece 11 having a hollow cylindrical drive shaft 12 mounted for rotation with the handpiece turbine 13. Positioned within the hollow drive shaft 12 is radially collapsed hollow cylindrical chuck 14 which is shown noncollapsed in FIGS. 2 and 3.

The cylindrical chuck 14 includes a central portion 15 having a slightly reduced outside diameter in which three axial slots 16 are cut. Extending the full length of central portion 15 the axial slots 16 terminate at the front end chuck portion 17 and rear end chuck portion 18. The slots 16 are equally spaced 120° apart around the circumference of central chuck portion 15 to form the equally spaced elongated leaf springs 20.

The outside diameters of the front and rear end chuck portions 17 and 18 are adapted respectively for locational interference and force fits within the drive shaft 12. Before insertion of the cylindrical chuck 14 into the drive shaft 12, the leaf springs 20 of chuck central portion 15 are radially, inwardly collapsed as shown in FIG. 1. Also the annular space 19 surrounding the central chuck portion 15 is packed with a resilient material 21. This material may be, for example, one of the commercially available silicone rubber adhesive sealants which adheres to material without priming and cures at room temperature to a hard, resilient silicone rubber. An adhesive sealant of this type, marketed by General Electric which cures to a solid rubber having a Shore A hardness of 28, a tensile strength of 350 p.s.i., a tear resistance of 40 lbs. per inch and an elongation of 500%, has been found particularly suitable for this use.

After having been firmly positioned within the drive shaft 12, the cylindrical chuck 14 is prepared to receive the shaft of grinding tool 24. The inside diameters of front and rear end chuck portions 17 and 18 provide locational fits for the bur shaft 24 and preferably the inside diameter of front end chuck portion 17 is 0.0001–0.0002 smaller than that of rear end chuck portion 18 so as to provide a locational interference fit with bur shaft 24.

Thus upon insertion into the cylindrical chuck 14 the bur shaft 24 will pass relatively easily through rear end chuck portion 18 until reaching the constriction formed by the inwardly collapsed leaf springs 20. Pressure must then be exerted on the bur shaft 24 causing the leaf springs 20 to expand against the inwardly directed force produced by the resiliency of the confined adhesive material 21 and the leaf springs themselves. Upon further axial movement the bur shaft 24 will be firmly aligned within front end chuck portion 17 and will finally become seated against the internal shoulder 27 of the drive shaft 12. The aperture 31 in the internal shoulder 27 enables a drill removing tool to be inserted for ejection of the bur 24.

During operation of the dental handpiece 11, the actuation of the turbine 13 will produce rotation of the drive shaft 12 and the force fitted cylindrical chuck 14. The resiliency of outwardly forced adhesive material 21 and leaf springs 20 produces between the interior leaf spring surfaces 28 and the bur shaft 24 a large frictional force which insures a positive rotational drive to the bur 24. Furthermore, the fitted internal surfaces 22, 23 of front and rear end chuck portions 17, 18 located on either side of the gripping springs 20 assures a precise axial alignment of the bur shaft 24. This axial alignment provides the highly desirable linear stability exhibited by the instrument during use.

Preferably, the cylindrical chuck 14 is made of stainless steel to insure long life and a high degree of leaf spring resiliency which will increase by use as the springs 20 become work hardened by periodic insertion and removal of selected tools. However other materials can also be used, such as, for example, carbon steel which is properly heat treated to produce an adequate resiliency.

Obviously many modifications and variations of the present invention are possible in the light of the above teachings. For example only, although the tool holding chuck embodiment shown and described is uniquely suited for use in an air driven dental handpiece the chuck can also be used advantageously with other types of rotational and static equipment. It is, therefore, to be understood that within the scope of the appended claims, the invention can be practiced otherwise than as specifically described.

What is claimed is:

1. A chuck device adapted to hold for rotation the shaft of a work tool and comprising a hollow cylindrical chuck body having a central body portion straddled by a front end body portion and a rear end body portion, said front end portion having an inside diameter slightly smaller than the inside diameter of said rear end portion, said central body portion possessing a plurality of shots which are entirely defined by the surface of said central body portion along the length thereof, and an inwardly projecting resilient portion formed between said slots in said central body portion and forming an inner diameter for said central body portion which is smaller than the interior diameters of said front and rear end body portions.

2. A chuck device adapted to hold for rotation the shaft of a work tool and comprising a hollow cylindrical chuck body positioned within and adapted for rotation with a hollow cylindrical drive shaft, said hollow cylindrical chuck body having a central body portion straddled by a front end body portion and a rear end body portion, a plurality of slots entirely defined by the surface of said central body portion, said central body portion being inwardly collapsed along said slots to provide a resilient inner chuck portion of reduced diameter, and a resilient binding material positioned between the external surface of said central body portion and the internal surface of said hollow cylindrical drive shaft.

3. In a dental handpiece apparatus having a hollow cylindrical drive shaft, a hollow cylindrical chuck body positioned within and adapted for rotation with said hollow cylindrical drive shaft, said hollow cylindrical chuck body having a central body portion straddled by a front end body portion and a rear end body portion, a plurality of elongated slots entirely defined by the surface of said central body portion and extending along the length thereof, said central body portion projecting inwardly to form a resilient inner chuck portion having an internal diameter smaller than the interanl diameters of said front and rear end body portions, and a resilient material confined between the external surface of said central body portion and the internal surface of said hollow cylindrical drive shaft so as to resiliently resist outward radial movement of said central body portion upon insertion thereinto of a tool shaft.

4. A dental handpiece apparatus according to claim 3 wherein said central body portion is inwardly collapsed along said slots.

5. A dental handpiece apparatus according to claim 4 wherein the noncollapsed outside diameter of said central body portion is substantially smaller than the inside diameter of said hollow cylindrical drive shaft thereby providing a substantial space therebetween for said resilient material.

6. A dental handpiece apparatus according to claim 4 wherein the inside diameter of said front end portion is slightly smaller than the inside diameter of said rear end portion.

7. A dental handpiece apparatus according to claim 4 wherein said resilient material is molded between the external surface of said central body portion and the internal surface of said hollow cylindrical drive shaft.

8. A dental handpiece according to claim 7 wherein said resilient material is a self-hardening silicone rubber material.

9. A chuck device comprising a hollow cylindrical drive shaft, a hollow cylindrical chuck body positioned within and adapted for rotation with said hollow cylindrical drive shaft, said hollow cylindrical chuck body having a central body portion straddled by a front end body portion and a rear end body portion, a plurality of elongated slots entirely defined by the surface of said central body portion and extending along the length thereof, said central body portion projecting inwardly to form a resilient inner chuck portion having an internal diameter smaller than the internal diameters of said front and rear end body portions, and a resilient material molded into a space between the external surface of said central body portion and the internal surface of said hollow cylindrical drive shaft so as to resiliently resist outward radial movement of said central body portion upon insertion thereinto of a tool shaft.

10. A chuck device according to claim 9 wherein said central body portion is inwardly collapsed along said slots.

11. A chuck device according to claim 10 wherein the noncollapsed outside diameter of said central body portion is substantially smaller than the inside diameter of said hollow cylindrical drive shaft thereby providing a substantial space therebetween for said molded resilient material.

12. A chuck device according to claim 10 wherein the inside diameter of said front end portion is slightly smaller than the inside diameter of said rear end portion.

13. A chuck device according to claim 2 wherein said slots are elongated and extend along the length of said central body portion.

14. A chuck device according to claim 13 wherein said elongated slots are substantially parallel to the axis of said hollow cylindrical body and are substantially equally spaced about the circumference thereof.

15. A chuck device according to claim 13 wherein the noncollapsed outside diameter of said central body portion is smaller than the outside diameters of said rear and front end body portions.

16. A chuck device according to claim 13 wherein the inside diameter of said front end portion is slightly smaller than the inside diameter of said rear end portion.

17. A chuck device according to claim 13 wherein said slots are three in number and are spaced about the circumference of said hollow cylindrical body by 120°.

18. A chuck device according to claim 13 wherein said resilient binding material is a self-hardening silicone rubber material.

References Cited by the Examiner

UNITED STATES PATENTS

| 1,438,021 | 12/1922 | Crossley | 279—51 |
|---|---|---|---|
| 2,066,659 | 1/1937 | Templeton | 279 |
| 2,228,863 | 1/1941 | Wright | 279—46 |
| 2,680,623 | 6/1946 | Hasselblad | 279—46 |
| 3,092,908 | 6/1963 | Flatland | 32—27 |

FOREIGN PATENTS 893,888   4/1962   Great Britain.

ROBERT C. RIORDON, *Primary Examiner.*

H. V. STAHLHUTH, E. A. CARPENTER,
*Assistant Examiners.*